United States Patent
Makowski et al.

(10) Patent No.: US 7,535,850 B2
(45) Date of Patent: May 19, 2009

(54) METHOD AND APPARATUS FOR PROVIDING VOICE PATH ASSURANCE TESTING THROUGH A PACKET NETWORK

(75) Inventors: Steven L. Makowski, Naperville, IL (US); Joseph John Kott, Aurora, IL (US); Douglas James Botkin, Aurora, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 582 days.

(21) Appl. No.: 10/856,495

(22) Filed: May 28, 2004

(65) Prior Publication Data

US 2005/0265241 A1 Dec. 1, 2005

(51) Int. Cl.
*H04L 12/26* (2006.01)
(52) U.S. Cl. ..................................... 370/249; 370/395.2
(58) Field of Classification Search ......... 370/241–249, 370/252–253, 254, 401, 395.2; 379/1.01, 379/1.04; 709/223–229
See application file for complete search history.

(56) References Cited

U.S. PATENT DOCUMENTS

| | | | |
|---|---|---|---|
| 5,440,565 A * | 8/1995 | Miyamoto et al. | 370/248 |
| 6,188,689 B1 * | 2/2001 | Katsube et al. | 370/252 |
| 6,614,763 B1 * | 9/2003 | Kikuchi et al. | 370/248 |
| 2002/0141392 A1 * | 10/2002 | Tezuka et al. | 370/352 |
| 2004/0240381 A1 * | 12/2004 | Clark et al. | 370/229 |
| 2004/0240431 A1 * | 12/2004 | Makowski et al. | 370/352 |
| 2007/0127629 A1 * | 6/2007 | McDonald et al. | 379/1.01 |

* cited by examiner

*Primary Examiner*—Ricky Ngo
*Assistant Examiner*—Pao Sinkantarakorn

(57) ABSTRACT

A method and apparatus for voice path assurance (VPA) testing in a packet network such as an Internet Protocol (IP) network is provided. More specifically, the invention relates to a voice path assurance (VPA) testing technique that is initiated by the terminating side of a logical connection through an IP network. The technique of the present invention is used to verify connectivity and performance—during a call set-up procedure—between the terminating endpoint and the originating endpoint of the logical connection through the IP network.

18 Claims, 6 Drawing Sheets

WITHOUT VPA TEST

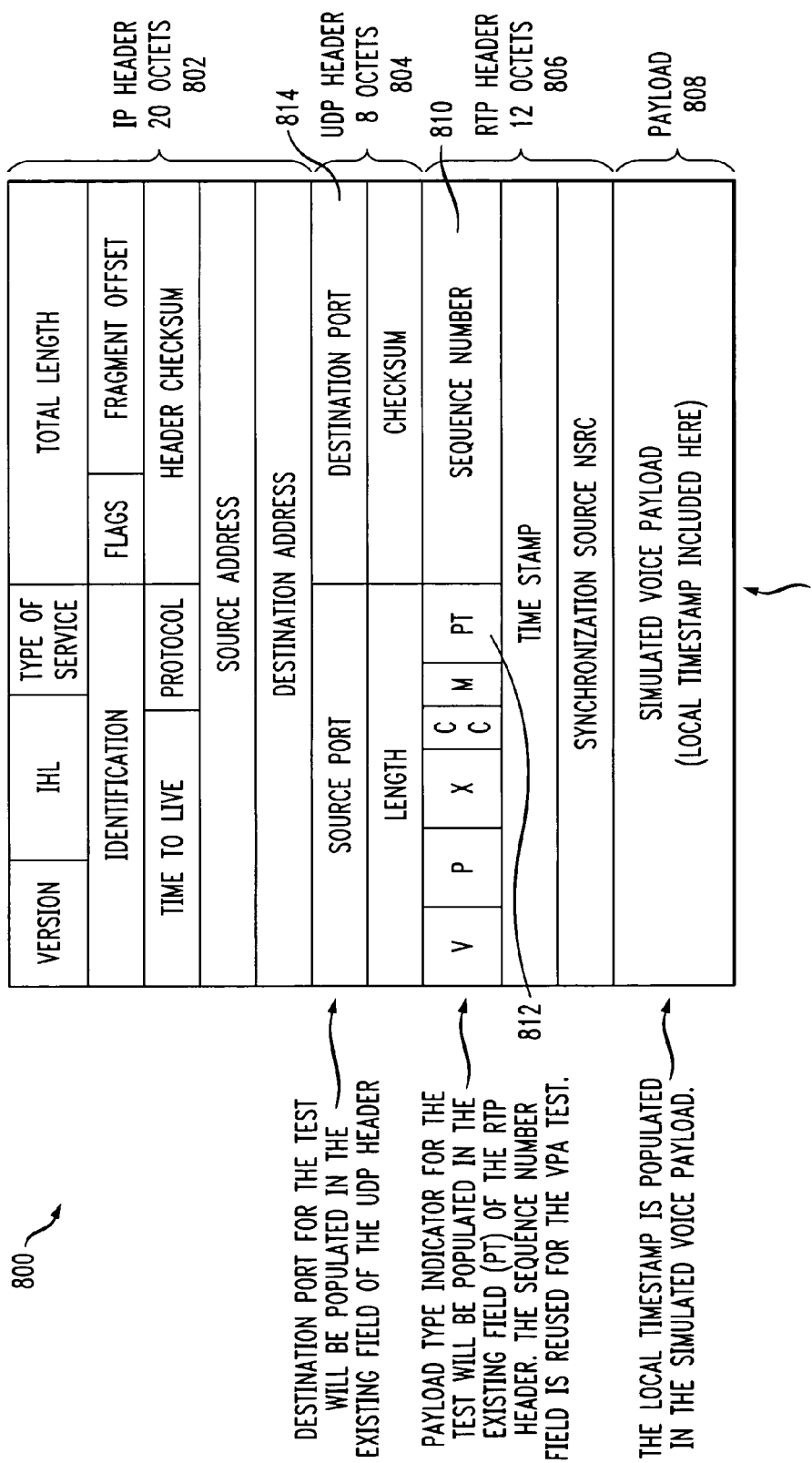

METHOD AND APPARATUS FOR PROVIDING VOICE PATH ASSURANCE TESTING THROUGH A PACKET NETWORK

BACKGROUND OF THE INVENTION

This invention relates to a method and apparatus for providing voice path assurance (VPA) testing in a packet network such as an Internet Protocol (IP) network. More specifically, the invention relates to a voice path assurance (VPA) testing technique that is initiated on the terminating side of a logical connection through an IP network. The technique of the present invention is used to verify connectivity and performance—during a call set-up procedure—between the terminating point and the originating point of a logical connection through the IP network.

While the invention is particularly directed to the art of voice path assurance testing in an IP network, and will be thus described with specific reference thereto, it will be appreciated that the invention may have usefulness in other fields and applications. For example, the invention may be used in any packet network where it is advantageous to conduct testing from the terminating side of a connection. Moreover, the invention may be used in environments wherein it is advantageous to conduct testing prior to setting up packet streams that are delay/loss sensitive, such as streaming video.

By way of background, establishing a voice path in many types of networks is relatively straightforward. As such, testing for voice path assurance is likewise straightforward and reliable. For example, in a time-division multiplexed (TDM) network, a voice path is established using physical, e.g. semi-permanent, connections between endpoints on the network. As such, these physical connections between endpoints can be continuously monitored, during both idle intervals and busy intervals, to ensure the integrity and performance of the connection. In addition, a provisionable per call voice path assurance test (i.e. continuity test) is typically implemented to supplement the continuous monitoring of the physical connection. The originating endpoint of the voice path initiates this continuity test between itself and the terminating endpoint for some or all of the calls carried on the connection.

Such testing could be applied to a packet network, but it has drawbacks that would render such testing impracticable. For example, in packet networks such as IP networks, there are no physical (e.g. semi-permanent) connections between the originating and terminating endpoints. Connections between endpoints in a packet network such as an IP network are logical. Sockets are provided at each endpoint to allow for packets to be communicated therebetween; however, no physical or semi-permanent path is maintained. Therefore, continuous monitoring to ensure connectivity is not practically possible. As a consequence, there is some probability that attempts to establish new logical connections across an IP network may fail or may result in low quality logical connections. Of course, neither outcome is desirable.

The present invention contemplates a new voice path assurance (VPA) testing technique that resolves the above-referenced difficulties and others.

SUMMARY OF THE INVENTION

A method and apparatus for providing voice path assurance (VPA) testing in a packet network such as an Internet Protocol (IP) network are provided. This technique differs from known VPA testing on TDM networks inasmuch as the technique according to the present invention is packet-based and is initiated by the terminating endpoint of the connection.

In one aspect of the present invention, the method comprises sending a logical connection request by the originating endpoint, the logical connection request comprising a voice path assurance token, receiving the logical connection request by the terminating endpoint, determining that the token is present in the logical connection request by the terminating endpoint, selectively performing a voice path assurance test on a bearer path between the terminating endpoint and the originating endpoint through the packet network and selectively acknowledging the logical connection request by the terminating endpoint based on the result of the voice path assurance test.

In another aspect of the present invention, the selectively performing of the voice path assurance test comprises transmitting data packets from the terminating endpoint to the originating endpoint to be looped-back to the terminating endpoint.

In another aspect of the present invention, the selectively performing of the voice path assurance test comprises transmitting data packets having a selected payload type indicator.

In another aspect of the present invention, the selectively performing of the voice path assurance test comprises transmitting data packets to a well known UDP port at the first endpoint.

In another aspect of the present invention, the system comprises means to perform the method.

In another aspect of the present invention, the system comprises an originating endpoint in communication with a packet network, the originating endpoint being operative to send a logical connection request through the packet network, the logical connection request comprising a voice path assurance token and a terminating endpoint in communication with the packet network, the terminating endpoint being operative to receive the logical connection request, determine that the token is present in the logical connection request, selectively perform a voice path assurance test on a bearer path between the terminating endpoint and the originating endpoint through the packet network, and selectively acknowledge the logical connection request based on the result of the voice path assurance test.

In another aspect of the present invention, the originating endpoint is further operative to establish a loop-back.

In another aspect of the present invention, the terminating endpoint is further operative to selectively perform the voice path assurance test by transmitting data packets from the terminating endpoint to the originating endpoint to be looped-back to the terminating endpoint.

In another aspect of the present invention, the terminating endpoint is operative to selectively perform the voice path assurance test by transmitting data packets having a selected payload type indicator.

In another aspect of the present invention, the terminating endpoint is further operative to selectively perform the voice path assurance test by transmitting data packets to a well known UDP port at the originating endpoint.

An advantage of the present invention is that it does not require network-based connectivity testing. The present invention provides for endpoint-based testing.

Another advantage of the present invention is that it provides a packet-based test for a packet network, rather than an analog test.

Another advantage of the present invention is that it provides for voice path assurance tests initiated by a terminating endpoint of the logical connection.

Another advantage of the present invention is that it can be run with or without the explicit knowledge of the originating endpoint.

Another advantage of the present invention is that connectivity between an originating endpoint and terminating endpoint in an IP network can be tested before the logical connection is established between the originating and terminating endpoints. Testing according to the present invention ensures that a logical connection can be established between the endpoints and also provides a snapshot of the cross-network delay and packet loss for the logical connection.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 8 is a diagram of an example of a test packet according to the present invention.

DETAILED DESCRIPTION OF THE PREFERRED EMBODIMENTS

Figure 1:
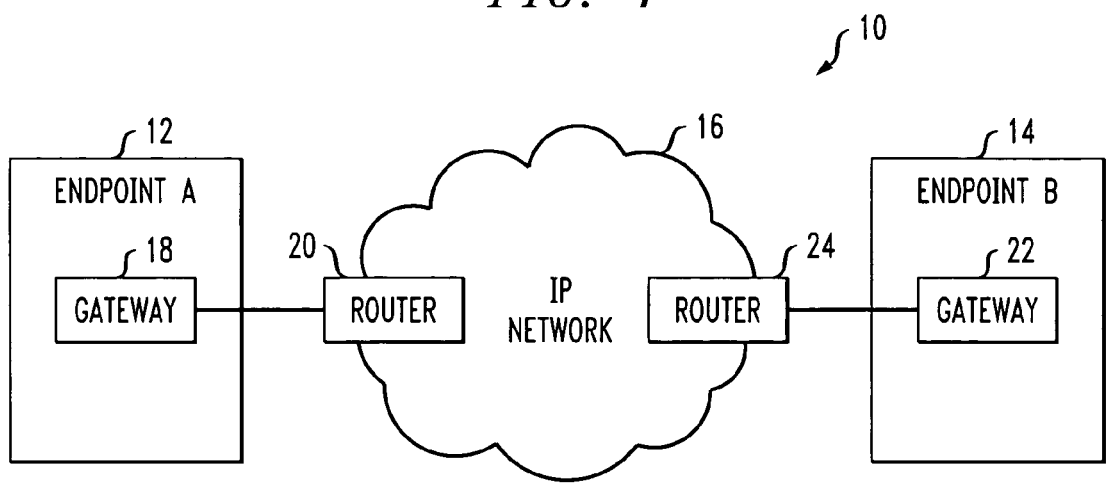
FIG. 1 is an illustration of an exemplary network into which the present invention may be implemented.

Referring now to the drawings wherein the showings are for purposes of illustrating the preferred embodiments of the invention only and not for purposes of limiting same, FIG. 1 provides a view of an overall system 10 into which the present invention may be implemented. As shown, FIG. 1 illustrates two switching endpoints on a packet network such as an IP network, i.e., endpoint A (12) and endpoint B (14). Each endpoint supports bearer connectivity to the IP network through its own gateway device and can originate and/or terminate logical connections. It will be appreciated that a signaling association (although not shown) is established between the endpoints, using either in-band or out-of-band techniques, for the purpose of establishing logical connections between the endpoints. Any appropriate signaling protocol may be used between the endpoints to establish a logical connection between the originating and terminating endpoints, e.g., endpoint A (12) and endpoint B (14), respectively.

As shown, the system 10 comprises the endpoints 12 and 14 and an Internet Protocol (IP) network 16, establishing a bearer path. The endpoint A (12) is connected to the IP network 16 by way of a gateway 18 and a switch/router 20. As those of skill in the art will understand, there may be a variety of different gateways and switch/routers connecting the endpoint A (12) to the IP network 16. Likewise, the endpoint B (14) is connected to the IP network 16 through a gateway 22 and a switch/router 24. Again, multiple gateways and switch/routers may establish connections between the endpoint B (14) and the IP network 16.

It will be understood by those of skill in the art that configuration of the system 10 may take a variety of forms. For example, the IP network 16 may be replaced by another form of a packet network. The endpoints may also take a variety of forms to accomplish appropriate functionality necessary in the implementation of a communication network. For example, the endpoints may be realized in any network element that originates or terminates an IP packet associated with a call, e.g., a switch, an IP gateway, an IP phone, . . . etc. In this regard, the endpoints may comprise multiple gateways and each gateway may comprise multiple ports (logical channels) that are available for communication functions. In this regard, the endpoints have IP addresses and UDP port numbers associated therewith.

Figure 2:
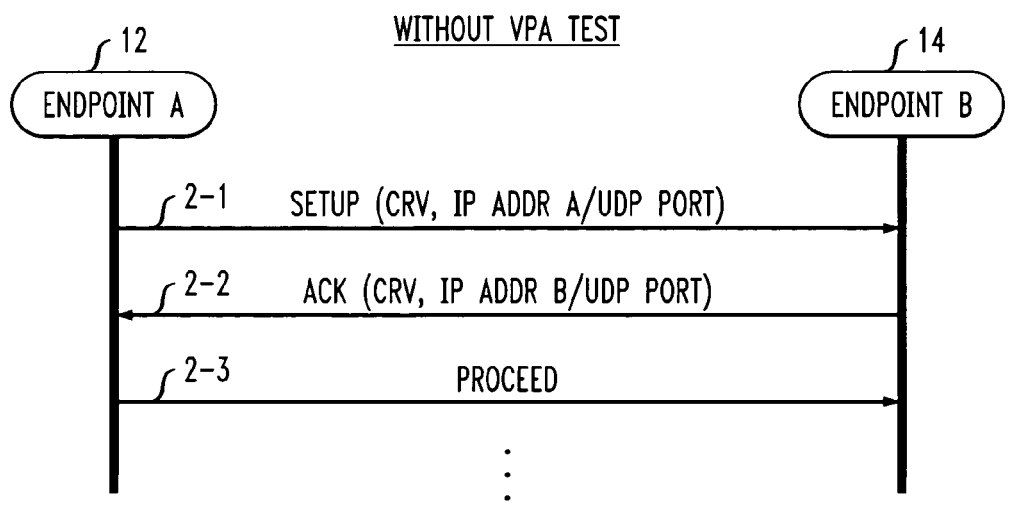
FIG. 2 is a call flow diagram illustrating operation of the network of FIG. 1 into which the present invention may be implemented.

A typical signaling sequence for establishing a logical connection between endpoints (such as those shown in FIG. 1) is shown in FIG. 2. During the connection set-up sequence, each endpoint will identify the logical port (IP address and UDP port number) that it will use to support the bearer connection and will send that information to the other endpoint in a signaling message. After each endpoint has received the logical port information from the other endpoint, the logical connection will be established between the endpoints.

It should be understood that, although FIG. 2 only shows signaling between endpoint A and endpoint B, the signaling actually travels from endpoint A through the IP network (via routers and other switching elements) to endpoint B, and vice-versa. This, of course, is also true for FIGS. 3-6. Signaling and bearer channels may travel through the same IP network or they may travel through different IP networks.

As shown, for example, endpoint A (12) transmits a logical connection request to the network that takes the form of a set-up message destined for endpoint B (14), although it is understood that endpoint A (12) does not have knowledge of the precise destination (e.g., the gateway that will be used by Endpoint B (14)) at this point in the process (at 2-1). It should be appreciated that the set-up message includes a call reference value (CRV) or other form of call identifier, an IP address associated with endpoint A (IP addr A) and a user datagram protocol (UDP) port (UDP port) associated with endpoint A that will support the connection. Upon receipt, endpoint B (14) acknowledges the set-up request and transmits an acknowledge message back to endpoint A (at 2-2). Similarly, the acknowledge message includes a call reference value (CRV), an IP address associated with endpoint B (IP addr B) and a UDP port from which the connection will be supported. Receipt of the acknowledgement by endpoint A (12) represents the first opportunity for endpoint A (12) to recognize a specific gateway at endpoint B (14) as the terminating endpoint for the transaction. A proceed message is then sent from endpoint A (12) to endpoint B (14) (at 2-3), and call processing occurs as is well known in the art.

It should be appreciated that the message sequence described in connection with FIG. 2 illustrates that which is conducted on the signaling channel between the endpoints, as opposed to the bearer path. Moreover, the sequence described above, as will be appreciated by those skilled in the art, typically includes no verification of the connectivity or performance of the bearer path between the endpoints prior to establishing the logical connection.

Figure 7:
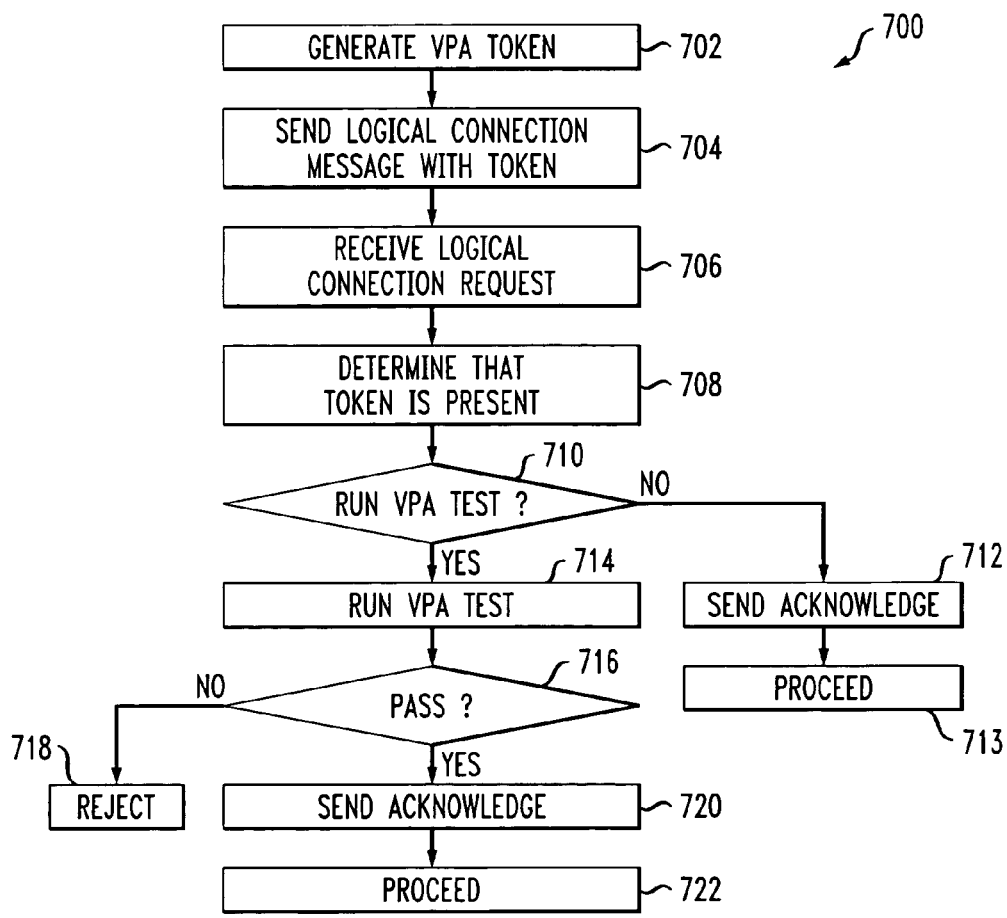
FIG. 7 is a flowchart illustrating a method according to the present invention.

With reference now to FIG. 7, a voice path assurance test method according to the present invention is illustrated. The method 700 is initiated by the generation of a Voice Path Assurance (VPA) testing token by, for example, an originating endpoint such as endpoint A (12). The endpoint A (12) then sends a logical connection request (or set-up message) including the VPA token to the network (at 704). The token takes the form of, for example, a parameter to be included in the set-up message.

The logical connection request (or set-up message) is received by an endpoint, e.g., endpoint B (14), serving as a terminating endpoint (at 706). The terminating endpoint 14 then determines whether or not the token is present in the logical connection request (at 708). Of course, if no token is present, conventional call processing is conducted. Conversely, if a token is present but endpoint B (14) has no ability to recognize the token, the token will simply be ignored or discarded. Conventional call processing will ensue.

Under the present invention, however, if a token is sent and recognized, a determination is made whether a VPA test should be run (at 710). This determination is based on data within the terminating endpoint 14. For example, a VPA test may run for all, some, or none of the logical connection requests that includes a VPA token. If no VPA test is to be run, an acknowledgement is sent back to the originating endpoint (at 712) and call processing proceeds in a conventional manner (at 713). If, however, a VPA test is to be run, the test is run on the bearer path (at 714). The actual test procedure may vary; however, preferred techniques are described below. A determination is then made as to whether the logical connection passed the VPA test (at 716). If not, the set-up request is rejected (at 718). If, however, the logical connection passes the VPA test, an acknowledgement is then sent from the terminating endpoint to the originating endpoint (at 720). Call processing then proceeds as is conventional (at 722).

It should be appreciated that this overall method according to the present described embodiment may be implemented in a variety of manners. Specific implementation may depend on the actual networks used and the objectives of the network(s) design. However, it should be appreciated that any such alternative embodiments will preferably include initiation of the VPA test from the terminating endpoint of the logical connection.

Figure 3:
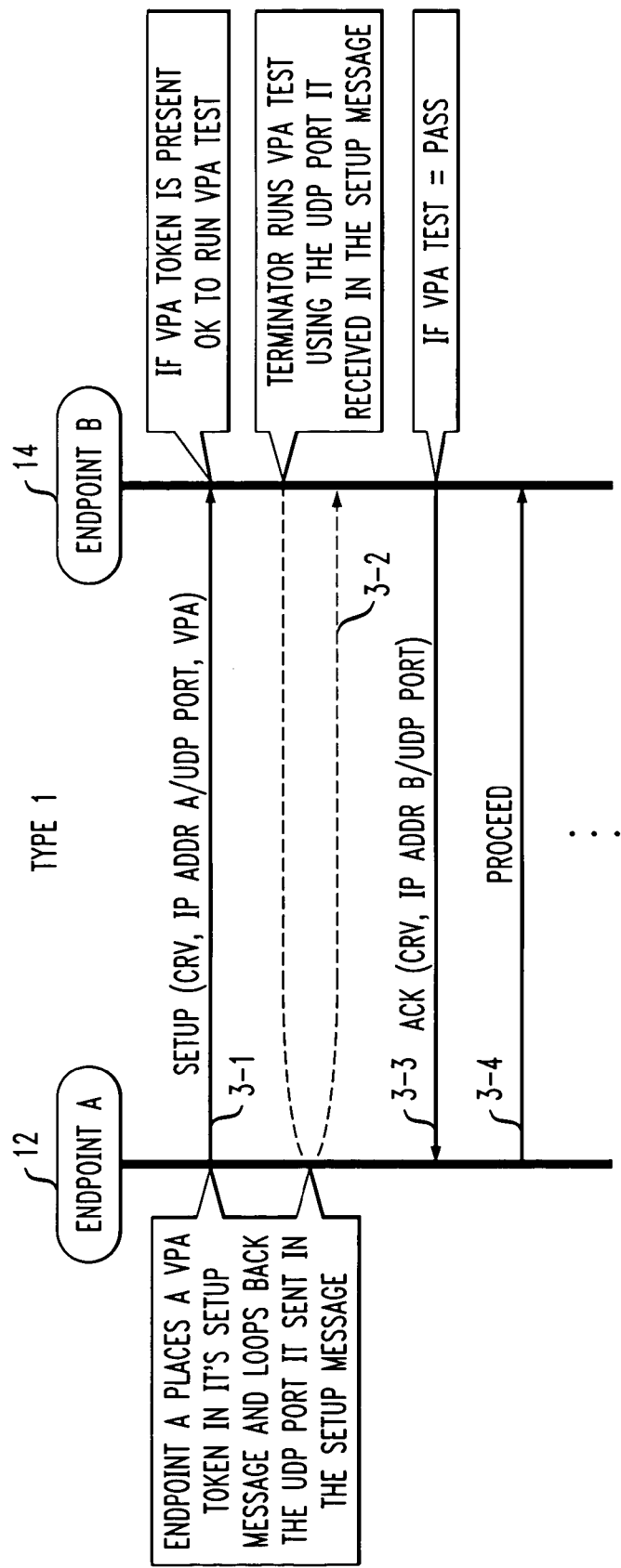
FIG. 3 is a call flow diagram illustrating an embodiment of the present invention.
Figure 4:
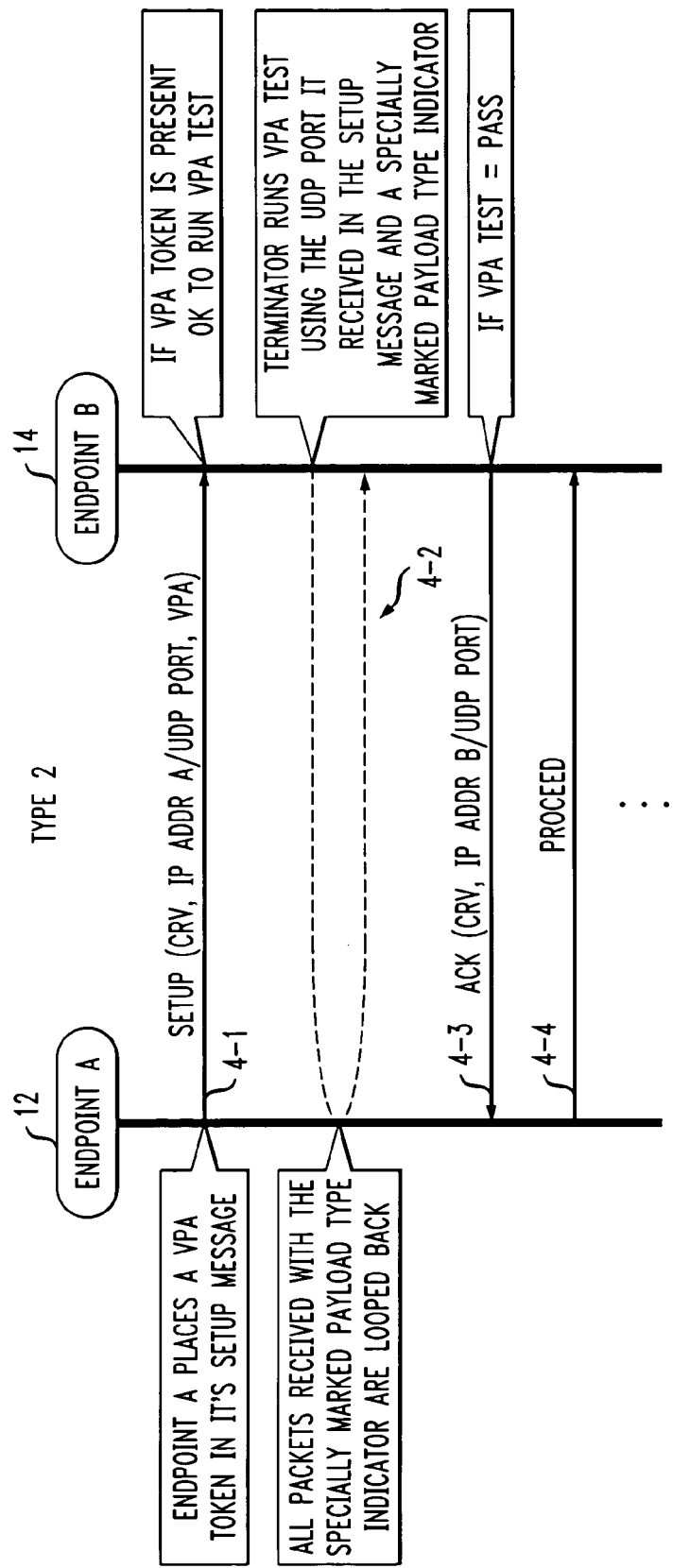
FIG. 4 is a call flow diagram illustrating another embodiment of the present invention.
Figure 5:
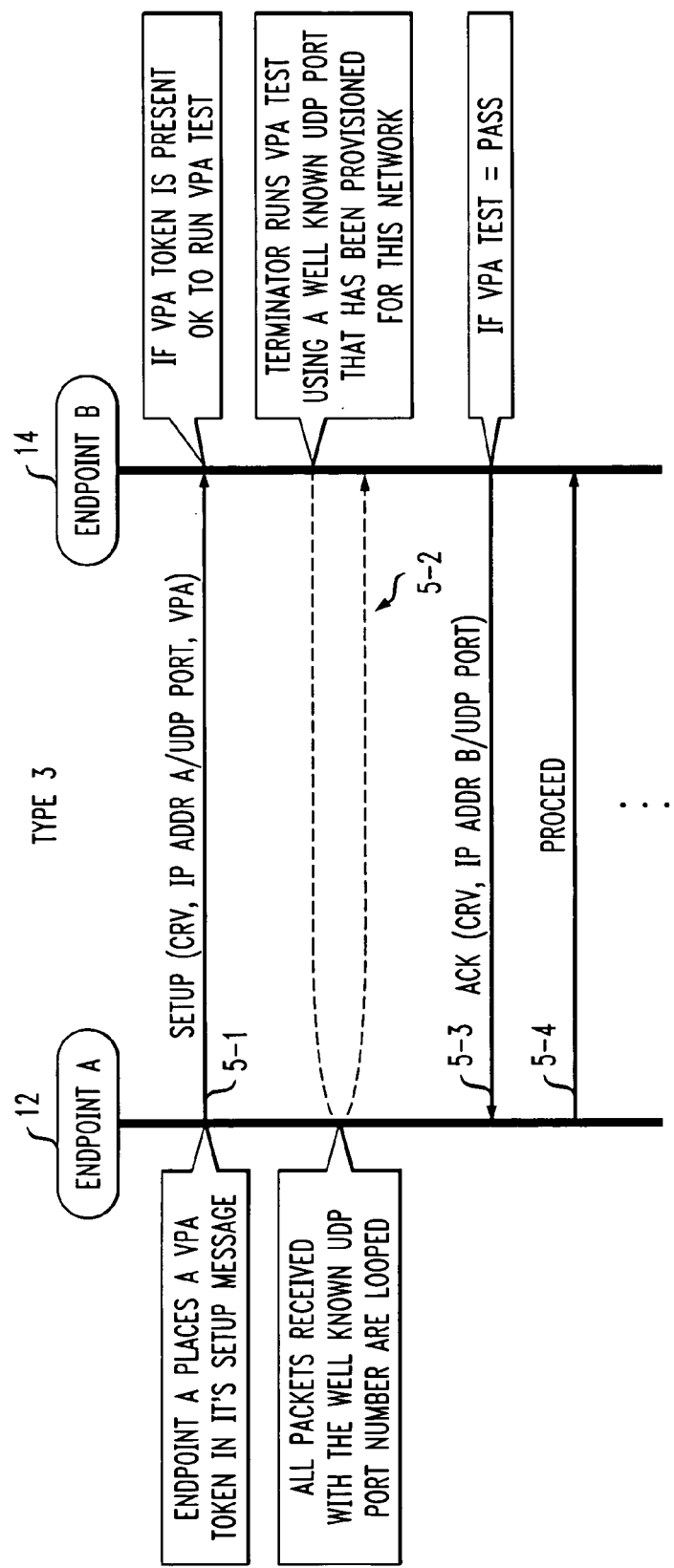
FIG. 5 is a call flow diagram illustrating still another embodiment of the present invention.

Along these lines, FIGS. 3, 4 and 5 illustrate three different, and exemplary, modified connection set-up procedures. In general, as noted above, a voice path assurance (VPA) test is initiated by the terminating endpoint to verify the connectivity and performance of the logical connection between itself and the originating endpoint before the connection is established between the endpoints. A service provider may choose any, or all, of the specific embodiments of the VPA test procedures identified below to support VPA testing in their network.

Referring now to FIG. 3, an embodiment (Type 1—Originator Auto Loop) of the present invention is illustrated. A packet-based voice path assurance (VPA) test is initiated by the terminating endpoint for the logical connection—after receiving the logical port information from the originating endpoint but before the terminating endpoint has sent its logical port information to the originating endpoint for the connection.

As shown, the packet-based voice path assurance test procedure is sequenced as follows: a) the originating endpoint (e.g., endpoint A (12) indicates its ability to support VPA testing by passing a "token" (e.g., the "VPA" token sent with the call reference value, IP address and UDP port number in the set-up message) in the connection set-up request it sends to the terminating endpoint (e.g., endpoint B (14)) (at 3-1); b) the originating endpoint establishes a looped-back condition for the logical port (IP addr/UDP port) that it sent to the terminating endpoint in the connection set-up request; and, c) the terminating endpoint decides to run a VPA test based on the presence of the VPA token in the connection set-up request and its local data (local data may indicate that VPA is to be run on all, some, or none of the incoming connection requests).

The packet-based voice path assurance test is then implemented over the bearer path (at 3-2). First, the terminating endpoint 14 allocates a logical port for the connection from its available pool of logical ports (IP address and UDP port). The terminating endpoint 14 then sends one or more test packets, from the logical port it has allocated for the connection, to the logical port it received in the connection set-up message from the originating endpoint 12. The test packets are looped pack by the originating endpoint.

The test packets sent by the terminating endpoint 14 contain a sequence number (as may be dictated by an appropriate protocol) and a local timestamp (indicating, for example, the local time at the terminating endpoint). The sequence number is used by the terminating endpoint 14 to determine if any test packets were lost. The timestamp is used by the terminating endpoint 14 to measure the estimated packet transit delay between the originating and terminating endpoints. The success or failure of the voice path assurance test is determined by provisionable threshold parameters for the test that are maintained by the terminating endpoint. With reference to FIG. 8, an example of a VPA test packet is shown. Example test packet 800 comprises an IP header 802, a UDP header 804, an RTP header 806 and a payload 808. As noted above, the test packet 800 includes the sequence number 810 within the RTP header 806 and the timestamp included within the payload 808. Also shown is a payload type indicator 812 and a destination port field 814.

If the VPA test passes, the terminating endpoint 14 completes the connection set-up procedure by sending its IP address and its logical port information to the originating endpoint through an acknowledge message allowing the logical connection to be continued (at 3-3). The originating endpoint will automatically remove the looped-back condition on its logical port when it receives this information from the terminating endpoint. Call processing then proceeds (at 3-4).

Figure 6:
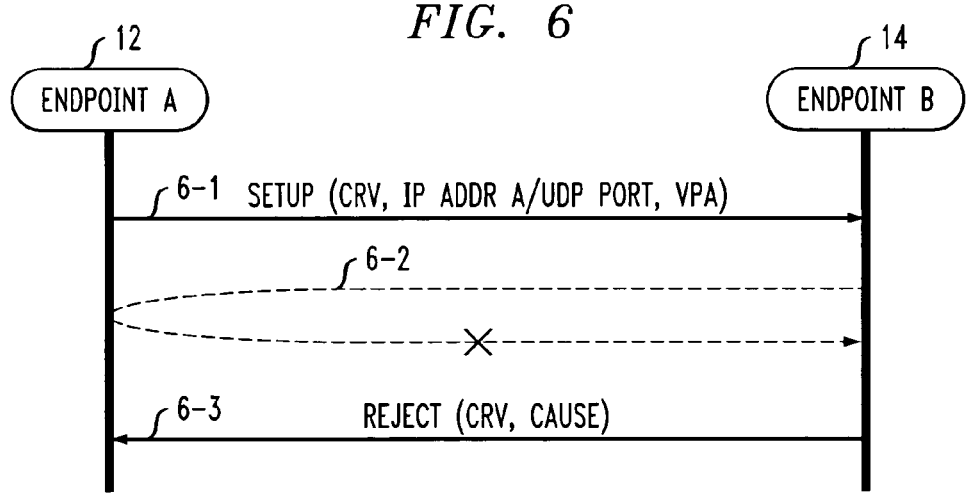
FIG. 6 is a call flow diagram illustrating selected aspects of the present invention.

If the VPA test fails, the terminating endpoint 14 may take either of the following actions based on its internal provisioning. It may complete the connection set-up procedure and create an error report. Or, as shown in FIG. 6, it may reject the connection set-up request and create an error report. In either case, the originating endpoint will automatically remove the looped-back condition on its logical port when it receives this information from the terminating endpoint. When a connection request has been rejected by the terminating endpoint, the originating endpoint may try to alternately route the connection if an alternate route is available.

With reference to FIG. 6, the endpoint A transmits a logical connection request, or set-up message, to endpoint B (at 6-1), as previously described. Endpoint B then processes the logical connection request and selectively conducts a loopback test over the bearer path (at 6-2). In the event that the loopback test fails, as illustrated by the X at 6-2, endpoint B transmits a reject message to endpoint A (at 6-3). It should be understood that the reject message may take a variety of forms but, preferably, includes the call reference value (CRV) sent by the originator and data indicating the cause of the failure. It should be understood that the process described in connection with FIG. 6 also applies to test failures experienced under the techniques of FIGS. 4 and 5.

Referring now to FIG. 4, another embodiment (Type 2—Payload Type Identifier) of the present invention is illustrated. A packet-based voice path assurance test is initiated by the terminating endpoint 14 for the connection after receiving the logical port information from the originating endpoint 12 but before the terminating endpoint 14 has sent its logical port information to the originating endpoint 12 for the connection.

The packet-based voice path assurance test procedure is sequenced as follows: a) the originating endpoint 12 indicates its ability to support VPA testing by passing a "token" (e.g., the "VPA" token sent with the call reference value (CRV), IP address and UDP port number in the set-up message) in the connection set-up request it sends to the terminating endpoint (at line 4-1); b) endpoints on the network are provisioned to initiate/recognize packets that contain a unique payload type identifier as "loop-back packets"; and c) the terminating endpoint 14 bases its decision to run a VPA test on the presence of the VPA "token" in the connection set-up request and its local data (local data may indicate that VPA is to be run on all, some, or none of the incoming connection requests).

The packet-based voice path assurance test is then implemented over the bearer path (at 4-2). Initially, the terminating endpoint 14 allocates a logical port for the connection from its available pool of logical ports (IP address and UDP port). The terminating endpoint 14 then sends one or more test packets, from the logical port it has allocated for the call, to the logical port it received in the connection set-up message from the originating endpoint 12. The test packets sent by the terminator contain a unique payload type identifier—"loop-back packets." In this regard, the payload type indicator 812 (FIG. 8) is appropriately modified. The test packets are thus looped-back by the originating endpoint 12.

The test packets sent by the terminating endpoint 14 resemble that of FIG. 8 and contain a sequence number (as may be indicated by an appropriate protocol) and a local timestamp (indicating, for example, the local time at the terminating endpoint). The sequence number is used by the terminating endpoint 14 to determine if any test packets were lost. The timestamp is used by the terminating endpoint 14 to measure the estimated packet transit delay between the originating and terminating endpoints. The success or failure of the voice path assurance test is determined by provisionable threshold parameters for the test that are maintained by the terminating endpoint.

If the VPA test passes, the terminating endpoint 14 completes the connection set-up procedure by sending its IP address and its logical port information in an acknowledge message to the originating endpoint 12 allowing the logical connection to continue (at 4-3). Call processing then proceeds (at 4-4).

If the VPA test fails, the terminating endpoint 14 may take either of the following actions based on its internal provisioning. It may complete the connection set-up procedure and create an error report. Or, as shown in FIG. 6, it may reject the connection set-up request and create an error report. When a connection request has been rejected by the terminating endpoint, the originating endpoint may try to alternately route the connection if an alternate route is available.

Referring now to FIG. 5, another embodiment (Type 3—Well Known UDP Port) of the present invention is illustrated. A packet-based voice path assurance test that is initiated by the terminating endpoint 14 for the connection after receiving the logical port information from the originating endpoint but before the terminating endpoint has sent its logical port information to the originating endpoint for the connection.

The packet-based voice path assurance test procedure is sequenced as follows: a) the originating endpoint 12 indicates its ability to support VPA testing by passing a "token" (e.g., the "VPA" token sent with the call reference value (CRV), IP address and UDP port number in the set-up message) in the connection set-up request it sends to the terminating endpoint (at line 5-1); b) endpoints on the network are provisioned to initiate/recognize packets that contain a well known UDP port number as "loop-back packets"; and, c) the terminating endpoint 14 bases its decision to run a VPA test on the presence of the VPA "token" in the connection set-up request and its local data (local data may indicate that VPA is to be run on all, some, or none of the incoming connection requests).

The packet-based voice path assurance test is then implemented over the bearer path (at 5-2). Initially, the terminating endpoint 14 allocates a logical port for the connection from its available pool of logical ports (IP address and UDP port). The terminating endpoint 14 then sends one or more test packets to the originating endpoint. The test packets sent by the terminating endpoint 14 contain the IP address sent by the originating endpoint in the connection set-up request and the well-known UDP port number (e.g., in the destination port field 814 (FIG. 8)) so they are "loop-back packets." The test packets are thus looped-back by the originating endpoint 12.

The test packets sent by the terminating endpoint 14 resemble that of FIG. 8 and contain a sequence number (as may be indicated by an appropriate protocol) and a local timestamp (indicating, for example, the local time at the terminating endpoint). The sequence number is used by the terminating endpoint 14 to determine if any test packets were lost. The timestamp is used by the terminating endpoint 14 to measure the estimated packet transit delay between the originating and terminating endpoints. The success or failure of the voice path assurance test is determined by provisionable threshold parameters for the test that are maintained by the terminating endpoint 14.

If the VPA test passes, the terminating endpoint 14 completes the connection set-up procedure by sending it's IP address and logical port information in an acknowledge message to the originating endpoint 12 allowing the logical connection to be continued (at line 5-3). Call processing then proceeds (at line 5-4).

If the VPA test fails, the terminating endpoint 14 will take either of the following actions based on its internal provisioning. It may complete the connection set-up procedure and create an error report. Or, as shown in FIG. 6, it may reject the connection set-up request and create an error report. When a connection request has been rejected by the terminating endpoint, the originating endpoint may try to alternately route the connection if an alternate route is available.

It should be understood that the present invention may be implemented using a variety of hardware configurations and software techniques. The precise configurations and techniques may vary from implementation to implementation. As an example, however, it is to be appreciated that the methods described in connection with the present invention may be implemented in software that resides at the endpoints and may well be distributed throughout the system as is appropriate.

The above description merely provides a disclosure of particular embodiments of the invention and is not intended for the purposes of limiting the same thereto. As such, the invention is not limited to only the above-described embodi-

We claim:

1. A method for voice path assurance testing through a communication system, the system comprising an originating endpoint in communication with a packet network and a terminating endpoint in communication with the packet network, the method comprising:
   sending a logical connection request by the originating endpoint, the logical connection request comprising a voice path assurance token;
   receiving the logical connection request by the terminating endpoint;
   determining that the token is present in the logical connection request by the terminating endpoint;
   selectively performing a voice path assurance test on a bearer path between the terminating endpoint and the originating endpoint through the packet network, the performing being initiated by the terminating endpoint and based on the presence of the token, wherein the performing further comprises transmitting data packets from the terminating endpoint to the originating endpoint to be looped-back to the terminating endpoint, wherein the data packets comprise at least one of a timestamp and a sequence number; and,
   selectively acknowledging the logical connection request by the terminating endpoint based on the result of the voice path assurance test.

2. The method as set forth in claim 1 wherein the logical connection request is a SET-UP message.

3. The method as set forth in claim 2 wherein the token is a parameter of the SET-UP message.

4. The method as set forth in claim 1 further comprising establishing a loop-back by the originating endpoint.

5. The method as set forth in claim 1 wherein the data packets further comprise a selected payload type indicator.

6. The method as set forth in claim 1 wherein the data packets further comprise a well known UDP port at the first endpoint.

7. A system useful for voice path assurance testing through a communication system, the system comprising:
   an originating endpoint in communication with a packet network, the originating endpoint being operative to send a logical connection request through the packet network, wherein the logical connection request comprises a voice path assurance token; and,
   a terminating endpoint in communication with the packet network, the terminating endpoint being operative to receive the logical connection request, being operative to determine that the token is present in the logical connection request, being operative to selectively initiate a voice path assurance test on a bearer path between the terminating endpoint and the originating endpoint through the packet network, and being operative to selectively acknowledge the logical connection request based on the voice path assurance test, wherein the terminating endpoint is further operative to selectively perform the voice path assurance test by transmitting data packets from the terminating endpoint to the originating endpoint to be looped-back to the terminating endpoint, wherein the data packets comprise at least one of a timestamp and a sequence number.

8. The system as set forth in claim 7 wherein the logical connection request is a SET-UP message.

9. The system as set forth in claim 8 wherein the token is a parameter of the SET-UP message.

10. The system as set forth in claim 7 wherein the originating endpoint is further operative to establish a loop-back.

11. The system as set forth in claim 7 wherein the data packets further comprise a selected payload type indicator.

12. The system as set forth in claim 7 wherein the data packets further comprise a well known UDP port at the originating endpoint.

13. A system for voice path assurance testing through a communication network, the system comprising:
   means for sending a logical connection request through the network, the logical connection request comprising a voice path assurance token;
   means for receiving the logical connection request;
   means for determining that the token is present in the logical connection request;
   means for selectively performing, based on the token, a voice path assurance test on a bearer path between a terminating endpoint corresponding to the receiving means and an originating endpoint corresponding to the sending means through the packet network, wherein the receiving means selectively initiates the voice path assurance test, wherein the means for selectively performing the voice path assurance test comprises means for transmitting data packets from the terminating endpoint to the originating endpoint to be looped-back to the terminating endpoint, wherein the data packets comprise at least one of a timestamp and a sequence number; and,
   means for selectively acknowledging the logical connection request based on the result of the voice path assurance test.

14. The system as set forth in claim 13 wherein the logical connection request is a SET-UP message.

15. The system as set forth in claim 14 wherein the token is a parameter of the SET-UP message.

16. The system as set forth in claim 13 further comprising means for establishing a loop-back.

17. The system as set forth in claim 13 wherein the data packets further comprise a selected payload type indicator.

18. The system as set forth in claim 13 wherein the data packets further comprise a well known UDP port at the originating endpoint.

* * * * *